United States Patent
Gonoji et al.

(10) Patent No.: US 11,010,238 B2
(45) Date of Patent: May 18, 2021

(54) MANAGEMENT SYSTEM OF STORAGE SYSTEM

(71) Applicant: Hitachi, Ltd., Tokyo (JP)

(72) Inventors: Takaaki Gonoji, Tokyo (JP); Toshimichi Kishimoto, Tokyo (JP)

(73) Assignee: HITACHI, LTD., Tokyo (JP)

( * ) Notice: Subject to any disclaimer, the term of this patent is extended or adjusted under 35 U.S.C. 154(b) by 102 days.

(21) Appl. No.: 16/488,218

(22) PCT Filed: Aug. 1, 2017

(86) PCT No.: PCT/JP2017/027817
§ 371 (c)(1),
(2) Date: Aug. 22, 2019

(87) PCT Pub. No.: WO2019/026171
PCT Pub. Date: Feb. 7, 2019

(65) Prior Publication Data
US 2020/0241947 A1 Jul. 30, 2020

(51) Int. Cl.
*G06F 11/07* (2006.01)
(52) U.S. Cl.
CPC ........ *G06F 11/0793* (2013.01); *G06F 11/079* (2013.01); *G06F 11/0727* (2013.01); *G06F 11/0751* (2013.01)
(58) Field of Classification Search
CPC .................. G06F 11/079; G06F 11/0793
See application file for complete search history.

(56) References Cited

U.S. PATENT DOCUMENTS

| | | | |
|---|---|---|---|
| 7,962,472 B2* | 6/2011 | Erickson | G06F 11/0709 707/713 |
| 8,185,781 B2* | 5/2012 | Chen | G06F 11/2257 714/26 |
| 8,468,391 B2* | 6/2013 | Balani | G06F 11/079 714/37 |
| 8,522,078 B2 | 8/2013 | Shimada et al. | |
| 10,417,084 B2* | 9/2019 | Liu | G06F 11/0709 |
| 2015/0271008 A1* | 9/2015 | Jain | H04L 41/0672 714/57 |
| 2018/0150348 A1* | 5/2018 | Hecox | G06F 11/0793 |

FOREIGN PATENT DOCUMENTS

| | | |
|---|---|---|
| JP | H05-189167 A | 7/1993 |
| JP | 2009-048403 A | 3/2009 |
| JP | 2011-076409 A | 4/2011 |
| JP | 2014-134956 A | 7/2014 |
| JP | 5223413 B2 | 6/2016 |
| JP | 2017-076299 A | 4/2017 |
| WO | 2015/072078 A1 | 5/2015 |

* cited by examiner

Primary Examiner — Joseph R Kudirka
(74) Attorney, Agent, or Firm — Procopio, Cory, Hargreaves & Savitch LLP

(57) ABSTRACT

A management system of a storage system specifies a matching rate between an occurred fault and each of one or more registered faults on the basis of fault analysis information which is information indicating, for each fault, a relation between a fault in the storage system and a fault detail including knowledge base information. Each of the one or more registered faults is a fault in which the information is registered in the fault analysis information. The management system displays information related to the registered fault including the specified matching rate with respect to each of the one or more registered faults.

9 Claims, 11 Drawing Sheets

FIG. 3

Fault status table
300

| Major classification | Minor classification | | Value |
|---|---|---|---|
| Basic information 301 | Occurrence time 311 | | 12/08/2016 12:00:00 |
| | Model 312 | | VSP G400 |
| | Version 313 | | 83-xx-xx-xx |
| Fault information 302 | Outline 321 | | - |
| | SIM list 322 | | AA##xx ... |
| | Operation 323 | Content 3231 | - |
| | | Target 3232 | - |
| | | Error code 3233 | - |

FIG. 4

Fault analysis table
51

| Major classification | Minor classification | | | Value 1 | ... |
|---|---|---|---|---|---|
| Basic information 401 | Fault number 411 | | | TRB0000001 | ... |
| | Occurrence time 412 | | | 12/08/2016 | ... |
| | Model 413 | | | VSP G400 | ... |
| | Device serial number 414 | | | 830011 | ... |
| | Version 415 | | | 83-xx-xx-xx | ... |
| Fault information 402 | Outline 421 | | | Fault XX occurred | ... |
| | SIM list 422 | | | AA0e01, AA0e02, BB0020 ... | ... |
| | Operation 423 | Content 4231 | | - | ... |
| | | Target 4232 | | - | ... |
| | | Error code 4233 | | - | ... |
| Analysis information 403 | Determination criterion 431 | | | 500 | ... |
| | Recovery procedure creation method 432 | | | 600 | ... |
| History 404 | Number of adoptions 441 | | | 3 | ... |
| | Basic information / Fault information 442 | | | ... | ... |

FIG. 5

Determination criterion table
500

| | Item | Value |
|---|---|---|
| Determination condition 1 501A | Outline 511Aa | Determination on LU blocking |
| | Determination method 511Ba | Determination based on detailed API of fault component |
| | Determination target 511Ca | LU |
| | Execution API 511Da | LU information acquisition API |
| | Keyword 511Ea | Blocked |
| | Necessity of recovery 511Fa | Necessary |
| Determination condition 2 501B | Outline 511Ab | Determination on graceful recovery by reboot |
| | Determination method 511Bb | Determination based on log file |
| | Determination target 511Cb | ProcessLog.txt |
| | Keyword 511Eb | .+\r\nReboot Start.+\r\n.+Success |
| | Necessity of recovery 511Fb | Unnecessary |

FIG. 6

Recovery procedure table
600

| | Item | | Value |
|---|---|---|---|
| Recovery procedure 1 601A | Outline 611Aa | | Create LU |
| | Procedure name 611Ba | | Create LU |
| | Parameter 1 611Ca1 | Target component 621CAa11 | LU |
| | | Attribute 621CBa11 | Fault component |
| Recovery procedure 2 601B | Outline 611Ab | | Define LU path to LU |
| | Procedure name 611Bb | | Define LU path |
| | Parameter 1 611Cb1 | Target component 621CAb11 | LU |
| | | Attribute 612CBb11 | Fault component |
| | Parameter 2 611Cb2 | Target component 612CAb21 | Port |
| | | Attribute 621CBb22 | Fault-related component |
| | | Related component 621CCb23 | LU |

# MANAGEMENT SYSTEM OF STORAGE SYSTEM

TECHNICAL FIELD

The present invention generally relates to management of a storage system.

BACKGROUND ART

For example, PTL 1 discloses a technology of generating procedures for resuming service of an information system stopped due to occurrence of faults. Moreover, for example, PTL 2 discloses a technology of displaying task candidates for solving troubles from troubleshooting cases registered in an IT system.

CITATION LIST

Patent Literature

Patent Literature 1: WO 2015/072078
Patent Literature 2: Japanese Patent No. 5223413

SUMMARY OF INVENTION

Technical Problem

In general, a storage system has a plurality of components which are complexly correlated with each other.

Therefore, there is a case in which one fault causes a plurality of components to fall into a fault state. In this case, it is often necessary to recover only the component which is the cause of the fault rather than recovering all components being in the fault state. However, in the technology of PTL 1, a recovery procedure is a static procedure which simply combines the order of respective components and fails to specify a component which is the cause of a fault and it is difficult to provide an appropriate recovery procedure. Moreover, in the technology of PTL 2, since components are not associated with a solving target trouble, it is difficult to solve the trouble using the correlation with the trouble.

On the other hand, in contrast to the above-mentioned case, there are often cases in which only one fault occurred is notified and a fault derived from the fault is not notified and cases in which it is necessary to operate a component where a fault has not occurred as well as a component where a fault has occurred. It is difficult for the technologies of PTL 1 and 2 to solve such cases.

Solution to Problem

A management system of a storage system specifies a matching rate between an occurred fault and each of one or more registered faults on the basis of fault analysis information which is information indicating, for each fault, a relation between a fault in the storage system and a fault detail including knowledge base information. Each of the one or more registered faults is a fault in which the information is registered in the fault analysis information. The management system displays information related to the registered fault including the specified matching rate with respect to each of the one or more registered faults.

Advantageous Effects of Invention

It can be expected that faults occurring in a storage system are recovered quickly.

BRIEF DESCRIPTION OF DRAWINGS

FIG. 3 illustrates a configuration of a fault status table.
FIG. 4 illustrates a configuration of a fault analysis table.
FIG. 5 illustrates a configuration of a determination criterion table.
FIG. 6 illustrates a configuration of a recovery procedure table.

DESCRIPTION OF EMBODIMENTS

Figure 1:
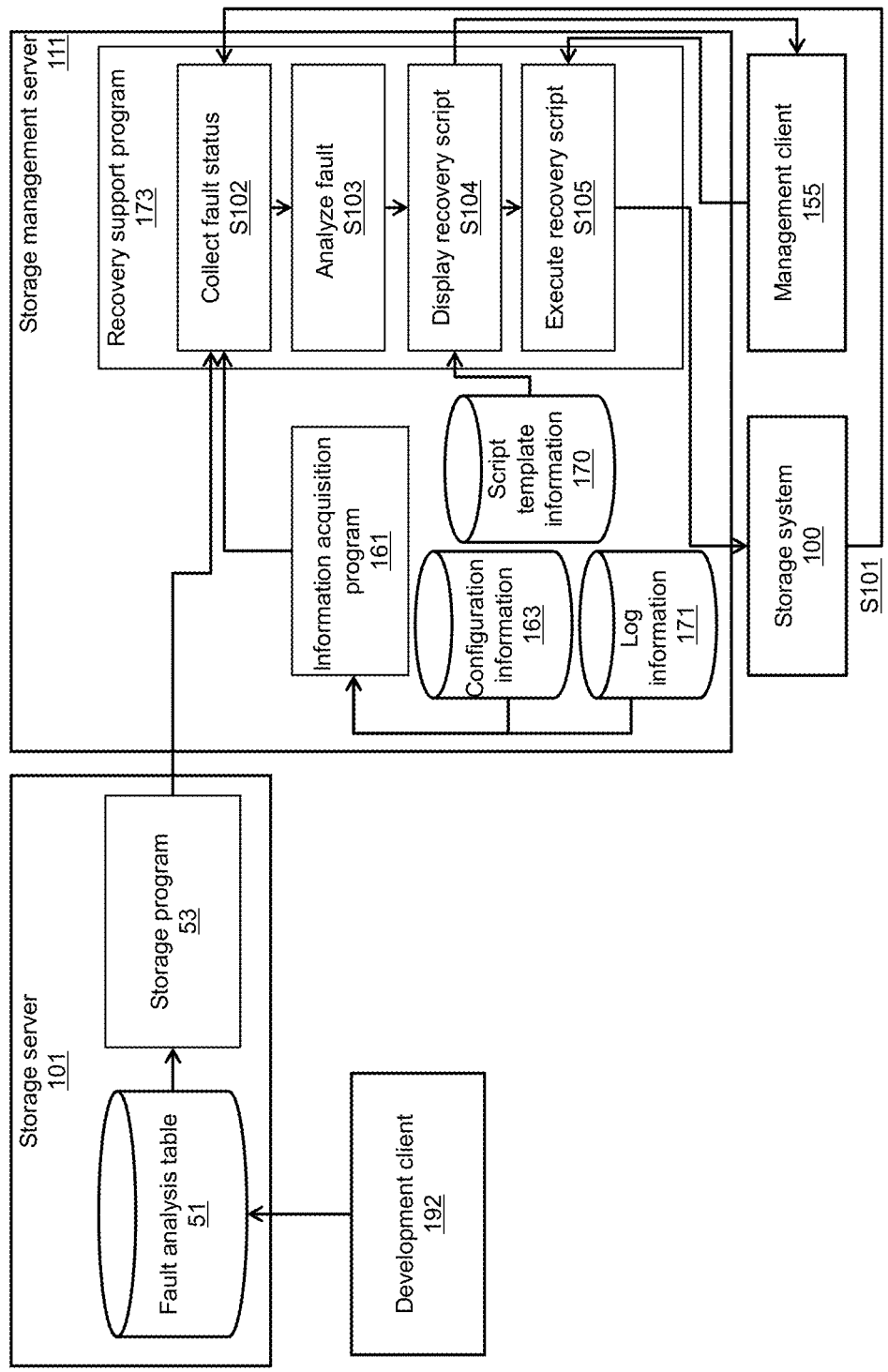
FIG. 1 illustrates an outline of an embodiment.

In the following description, an "interface unit" may include at least one of a user interface unit and a communication interface unit. A user interface unit may include at least one I/O device among one or more I/O devices (for example, an input device (for example, a keyboard and a pointing device) and an output device (for example, a display device)) and a display computer. The communication interface unit may include one or more communication interface devices. One or more communication interface devices may be one or more communication interface devices (for example, one or more NICs (Network Interface Cards)) of the same type and may be two or more communication interface devices (for example, NIC and an HBA (Host Bus Adapter)) of different types.

Moreover, in the following description, a "storage unit" includes at least a memory unit among a memory unit and a PDEV unit. The PDEV unit includes one or more PDEVs. The memory unit includes one or more memories. At least one memory may be a volatile memory and may be a nonvolatile memory. The storage unit is mainly used when a processor unit executes processing.

Moreover, in the following description, a "processor unit" includes one or more processors. At least one processor is typically a CPU (Central Processing Unit). A processor may include a hardware circuit that performs a part or all of processes.

Moreover, in the following description, although information is sometimes described using an expression of an "xxx table", the information may be expressed by an arbitrary data structure. That is, the "xxx table" may be referred to as "xxx management information" in order to show that information does not depend on a data structure. Moreover, in the following description, the configuration of each table is an example, one table may be divided into two or more tables, and all or a portion of two or more tables may be integrated into one table.

Moreover, in the following description, there may be cases where processing is described using a "program" as the subject. However, since the processing is performed while using a storage unit (for example, a memory) and/or an interface device (for example, a communication port) as necessary when a program is executed by a processor (for example, a CPU (Central Processing Unit)), a processor (or an apparatus or a system including the processor) may also be used as the subject of the processing. Moreover, the processor may include a hardware circuit that performs a part or all of the processes. A program may be installed in an apparatus such as a computer from a program source. The program source may be a program distribution server or a computer-readable (for example, non-transitory) recording medium, for example. Moreover, in the following description, two or more programs may be implemented as one program, and one program may be implemented as two or more programs.

In the following description, a "PDEV" means a physical storage device and typically may be a nonvolatile storage device (for example, an auxiliary storage device). For example, the PDEV is an HDD (Hard Disk Drive) or an SSD (Solid State Drive).

Moreover, in the following description, a "storage system" includes one or more physical storage apparatuses. At least one physical storage apparatus may be a general-purpose physical computer. At least one storage apparatus may execute a virtual computer (for example, a VM (Virtual Machine)) and may execute a SDx (Software-Defined anything). As the SDx, an SDS (Software Defined Storage) (an example of a virtual storage apparatus) or a SDDC (Software-defined Datacenter) may be used.

Moreover, in the following description, when the same types of elements are not distinguished from each other, common portions in the reference numerals may be used, whereas when the same types of elements are distinguished from each other, the reference numerals of the elements may be used.

Moreover, in the following description, a "component" means a constituent element of a storage system, and specifically, is a general term of a plurality of node devices (for example, storage devices) that forms the storage system and a plurality of components included in each of the storage devices. Examples of the node device include a physical node device (for example, a network switch) and a logical node device (for example, a virtual machine). Moreover, examples of the component include a physical component (for example, a microprocessor) and a logical component (for example, a logical volume).

Moreover, in the following description, a management system may include one or more computers. Specifically, for example, when a management computer displays information (specifically, a management computer displays information on a display device thereof or a management computer transmits display information to a remote display computer), the management computer is a management system. Moreover, for example, when a function equivalent to that of a management computer is implemented by a plurality of computers, the plurality of computers (which may include a display computer when the display computer displays information) is a management system. In the present embodiment, a storage management server 111 is a management computer and a management client 155 is a display computer. A display computer may be an example of a display device. A storage server 101 may be interpreted as a management computer. The storage management server 111 and the storage server 101 may be integrated with each other. Two or more of the storage management server 111, the management client 155, the storage server 101, the storage system 100, and a development client 192 may be a virtual system executed on a physical computing resource of the same computing system (for example, a cloud computing system).

FIG. 1 illustrates an outline of an embodiment.

A storage management server 111 that manages a storage system 100 is provided. The storage management server 111 may be provided for respective user companies, for example. The storage management server 111 displays information as support for fault recovery to a management client 155 which is a client of the server 111. The storage management server 111 executes an information acquisition program 161 and a recovery supporting program 173. Moreover, the storage management server 111 manages configuration information 163, log information 171, and script template information 170. The configuration information 163 is information related to a configuration of the storage system 100. The log information 171 is information related to the log of behavior or performance of the storage system 100. The script template information 170 includes information related to one or more script templates. A "script template" is a template of a script of a recovery procedure. A fault recovery process is defined by a combination of one or more recovery procedures of a plurality of recovery procedures and an execution order thereof.

The storage server 101 that manages a fault analysis table 51 which is an example of fault analysis information which is information related to past faults and the recovery thereof is provided. The fault analysis table 51 includes fault analysis tables for respective faults. The storage server 101 may be common to a plurality of user companies, for example. The storage server 101 receives information related to faults from a development client 192 which is a client of the server 101 and stores the information in the fault analysis table 51. The storage server 101 executes a storage program (for example, a DBMS (Database Management System)) 153. The storage server 101 and the storage management server 111 may be integrated with each other.

Hereinafter, an outline of an example of a process performed when a fault occurs in the storage system 100 will be described.

When a fault occurs in the storage system 100, a message (hereinafter a SIM (Service Information Message)) is notified from the storage system 100 to the storage management server 111 actively (or in response to an inquiry from the recovery supporting program 173) (S101). SIM includes information indicating a fault component (a component in a fault state) and a fault content (the content of a fault of the fault component). That is, SIM is associated with each of components in a fault state.

Upon receiving SIM, the recovery supporting program 173 collects a fault status on the basis the information included in the SIM (S102). Specifically, the recovery supporting program 173 performed the following operations, for example. The recovery supporting program 173 acquires information related to a fault component specified from the SIM from at least one of the configuration information 163 and the log information 171 with the aid of the information acquisition program 161. The recovery supporting program 173 creates a fault status table which is a table that stores information indicating a fault status on the basis of the acquired information and the information included in the SIM. The recovery supporting program 173 transmits the created fault status table to the storage program 53 of the storage server 101. The recovery supporting program 173 receives extraction result information including information extracted from the fault analysis table 51 using the fault status table from the storage server 101. The extraction result information includes one or more extracted entries. Each extracted entry includes at least a portion of value columns specified using the fault status table.

When the extraction result information is received, the recovery supporting program 173 analyzes faults (S103). Specifically, for example, the recovery supporting program 173 imports extracted entries from the received extraction result information one by one. The recovery supporting program 173 calculates a matching rate between each of the imported extracted entries and the fault status table with respect to each of the imported extracted entries.

The recovery supporting program 173 displays a recovery process (S104). In S104, for example, the recovery supporting program 173 determines a display priority of each of the extracted entries included in the extraction result information on the basis of the calculated matching rate. Moreover, the recovery supporting program 173 displays one or more pieces of information on the fault recovery process corresponding to each of one or more extracted entries included in the extraction result information so as to be arranged in descending order of display priorities. The pieces of information on the fault recovery process may be arranged in an execution order of one or more recovery procedures that form the fault recovery process.

The recovery supporting program 173 may create a recovery script of the recovery procedure with respect to the extracted entry before displaying information in S104 or when a recovery procedure desired by a user is selected from an information display screen. The recovery script may be a parameter value (for example, an ID number of a fault component) input to a parameter item of a script template. A "user" is a user (for example, an employee of a user company) of the management client 155.

The recovery supporting program 173 executes a recovery script (a script in which a command is described) corresponding to a selected recovery procedure (S105).

Hereinafter, the present embodiment will be described in detail.

Figure 2:
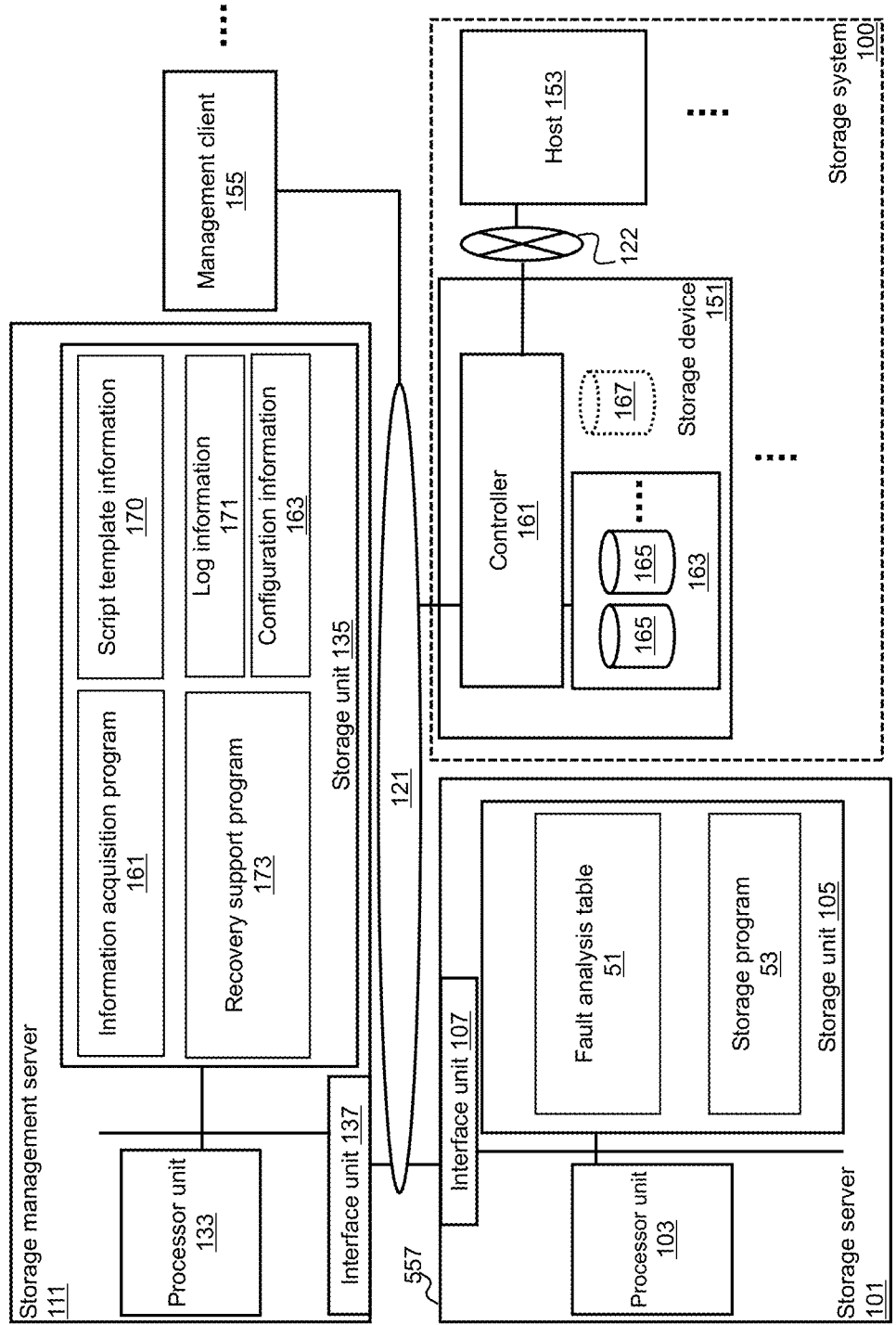
FIG. 2 illustrates a configuration of an entire system according to the present embodiment.

FIG. 2 illustrates a configuration of an entire system according to the present embodiment.

The storage system 100 is connected to a communication network 121 (for example, the Internet or a WAN (Wide Area Network)) and includes a plurality of components. The storage system 100 includes one or more storage devices 151 and one or more hosts 153 connected to one or more storage devices 151, for example. The host 153 is connected to the storage device 151 via a communication network 122 (for example, a SAN (Storage Area Network) or a LAN (Local Area Network)), for example.

The host 153 may be a physical computer or a virtual computer. The host 153 transmits an I/O request that designates a logical volume to the storage device 151.

The storage device 151 has a PDEV group 163 and a controller 161 connected to the PDEV group 163.

The PDEV group 163 may have at least one RAID (Redundant Array of Independent (or Inexpensive) Disks) group. The RAID group includes a plurality of PDEVs and stores data according to a predetermined RAID level.

The controller 561 has an interface unit (for example, a plurality of ports), a storage unit, and a processor unit connected to these units, for example. The controller 561 provides a plurality of logical volumes. Examples of the logical volume include a substantial logical volume (an actual volume) 165 based on the RAID group and a virtual logical volume (a virtual volume) 167 based on thin-provisioning.

The storage server 101 has an interface unit 107, a storage unit 105, and a processor unit 103 connected to these units. The interface unit 107 is connected to the communication network 121. The storage unit 105 stores information such as the fault analysis table 51 and a program such as the storage program 53. The processor unit 103 executes a program (a program such as the storage program 53) in the storage unit 105.

The management client 155 and the storage management server 111 are connected to the communication network 121. The storage management server 111 has an interface unit 137, a storage unit 135, and a processor unit 133 connected to these units. The interface unit 137 is connected to the communication network 121. The storage unit 135 stores information such as the log information 171, the configuration information 163, and the script template information 170. Moreover, the storage unit 135 stores programs such as the information acquisition program 161 and the recovery supporting program 173. The processor unit 133 executes a program (programs such as the information acquisition program 161 and the recovery supporting program 173) in the storage unit 135.

The information acquisition program 161 is a program for acquiring information and includes an information acquisition API (Application Programming Interface). Information related to the storage system 100 can be acquired by executing various commands (for example, GetStorageVersion) defined in the information acquisition API. The information related to the storage system 100 is stored on the storage management server 111 as the configuration information 163 and is updated in synchronization with the storage system 100 (for example, the storage device 151) periodically (or non-periodically).

The recovery supporting program 173 performs S102 to S105 (that is, supports recovery of faults), for example.

FIG. 3 illustrates a configuration of the fault status table.

The fault status table 300 has a value column. A plurality of values in the value column are broadly classified into basic information 301 and fault information 302. A fault corresponding to the fault status table 300 is referred to as a "target fault".

The basic information 301 includes information such as occurrence time 311, model 312, and version 313. The occurrence time 311 indicates an occurrence time of a fault. Although time may be represented by years, months, hours, minutes, and seconds, time may be represented more coarsely or minutely than this. The model 312 indicates the model of the storage device 151 in which a target fault has occurred. The version 313 indicates the version of the storage device in which a target fault has occurred.

The fault information 302 includes information such as outline 321, SIM list 322, and operation 323.

The outline 321 indicates an outline of an occurred target fault.

The SIM list 322 is a list of SIMs corresponding to occurrence of a target fault, specifically, a list of one or more fault IDs included in each of one or more notified SIMs. The fault ID is an ID as a combination of an ID number of a fault component type, an ID number of a fault content, and an ID number of a fault component, for example. Specifically, for example, in a fault ID "AA##xx", "AA" is an ID number of a fault component type, "##" indicates a fault content, and "xx" is an ID number of a fault component.

The operation 323 is information related to a screen operation (an operation that a user has performed on a screen such as a GUI (Graphical User Interface)) which is the cause of a target fault. The operation 323 includes information such as content 3231, target 3232, and error code 3233. The content 3231 indicates the content of a screen operation. The target 3232 indicates a target of a screen operation. The error code 3233 indicates an error code displayed as a result of a screen operation.

The outline 321 and the operation 323 may be input or edited manually by a user. The SIM list 322 may be set to the fault status table 300 automatically by the recovery supporting program 173. The basic information 301 may be information acquired via the information acquisition program 161 from the configuration information 163 or the log information 171 on the basis of an SIM. The fault status table 300 may include at least the SIM list 322, for example.

FIG. 4 illustrates a configuration of the fault analysis table.

The fault analysis table 51 has one or more value columns corresponding to each of one or more past faults. One fault corresponding to one value column in the fault analysis table 51 is referred to as a "registered fault". A plurality of values in each valve column are broadly classified into basic information 401, fault information 402, analysis information 403, and history 404. Hereinafter, one past registered fault will be described as an example ("registered fault of interest" in description of FIG. 4).

The basic information 401 is basic information of a storage device in which a registered fault of interest has occurred. The basic information 401 includes fault number 411, occurrence time 412, model 413, device serial number 414, and version 415. The fault number 411 is an ID number of a registered fault of interest. The occurrence time 412 indicates an occurrence time of a registered fault of interest. The model 413 indicates the model of a storage device in which a registered fault of interest has occurred. The device serial number 414 indicates a serial number of a storage device in which a registered fault of interest has occurred. The version 415 indicates the version of a storage device in which a registered fault of interest has occurred.

The fault information 402 includes information such as outline 421, SIM list 422, and operation 423. The outline 421 indicates an outline of a registered fault of interest. The SIM list 422 is a list (specifically, a list of one or more fault IDs included in each of one or more notified SIMs) of SIMs notified due to occurrence of a registered fault of interest. The operation 423 is information related to a screen operation which is the cause of a registered fault of interest. The operation 423 includes information such as content 4231, target 4232, and error code 4233. The content 4231 indicates the content of a screen operation. The target 4232 indicates the target of a screen operation. The error code 4233 indicates an error code displayed as a result of a screen operation.

The analysis information 403 includes information such as determination criterion 431 and recovery procedure creation method 432. The determination criterion 431 is information related to a determination criterion on whether a fault matches a registered fault of interest. The details of the determination criterion 431 may be a link to a determination criterion table 500 illustrated in FIG. 5. The recovery procedure creation method 432 is information related to creation of a series of recovery procedures. The details of the recovery procedure creation method 432 may be a link to a recovery procedure table 600 illustrated in FIG. 6. That is, the determination criterion table 500 and the recovery procedure table 600 may be prepared for respective value columns (for respective registered faults).

The history 404 indicates a history of recovery from a registered fault of interest in the past. The history 404 includes information such as number of adoptions 401 and basic/fault information 442. The number of adoptions 441 indicates the number of times (cases) that a fault recovery process (a series of recovery procedures) corresponding to a value column in the registered fault of interest is employed. The basic/fault information 442 is a list of basic information 301 and fault information 302 included in the fault status table for each of faults which have employed the fault recovery process.

FIG. 5 illustrates a configuration of the determination criterion table.

The determination criterion table 500 stores information related to each of one or more determination conditions. A "determination condition" is a condition that a fault is the same as or similar to a target fault. At least the determination criterion table 500 of the fault analysis table 51 corresponds to a knowledge base, for example, a knowledge (a knowledge in a developing source) input from the development client 192.

Specifically, for example, the determination criterion table 500 has a value column corresponding to one or more determination conditions. A plurality of values in the value column is one or more value sets (one or more values) corresponding to each of one or more determination conditions 501. For each determination condition 501, a value set has one or more determination condition elements 511. A determination condition 501A will be described as an example. That is, outline 511Aa indicates an outline of a content of determination on whether the determination condition 501A is satisfied. Determination method 511Ba indicates a method of determining whether the determination condition 501A is satisfied. The method indicated by the determination method 511Ba can be appropriately added from the development client 192. Determination target 511Ca indicates a target (for example, a component type or a file) checked for determining whether the determination condition 501A is satisfied. Execution API 551Da indicates an API used for determining whether the determination condition 501A is satisfied. Keyword 511Ea indicates a keyword used for determining whether the determination condition 501A is satisfied. Recovery necessity 511Fa indicates whether recovery is necessary or not.

FIG. 6 illustrates a configuration of the recovery procedure table.

The recovery procedure table 600 stores information related to each of one or more recovery procedures. Specifically, for example, the recovery procedure table 600 has a value column corresponding to one or more recovery procedures. A plurality of values in the value column is one or more value sets (one or more values) corresponding to each of one or more recovery procedures 601. For each recovery procedure 601, a value set has one or more recovery procedure elements 611. A recovery procedure 601A will be described as an example. That is, the recovery procedure 601A is associated with a component (at least one of a fault component and a fault-related component to be described later). Outline 611Aa indicates an outline of the recovery procedure 601A. Procedure name 611Ba indicates the name of the recovery procedure 601A, that is, the name of a script template corresponding to the recovery procedure 601A. Using the procedure name 611Ba as a key, a script template (file) corresponding to the recovery procedure 601A can be acquired from the script template information 170. Parameter 611Ca1 is information related to a parameter of a script template. The parameter 611Ca1 includes target component 621CAa11 and attribute 621CBa11. The target component 621CAa11 indicates a type of a component corresponding to a parameter value set to the script template. The attribute 621CBa11 indicates an attribute of a component indicated by the target component 621CAa11, and specifically, indicates whether a target component is a fault component or a fault-related component, for example. The "fault-related component" may be a component related to a fault component (a component where a fault has occurred). Specifically, for example, when at least a portion of the structure of the storage system 100 is a tree structure (topology) in which respective components are nodes and the nodes are connected by edges, the fault-related component may be a component connected to the fault component via one or more edges. Moreover, for example, when at least a portion of the structure of the storage system 100 is an inclusive structure in which a certain component is included in another component, the fault-related component may be a component which is included in the fault component or which includes the fault component. When either one of the structures is employed, the fault-related component may be a component superordinate or subordinate to the fault component. When the attribute 621CB is "fault-related component", the parameter 611C further includes a related component 611CC (for example, see parameter 611Cb2, attribute 621Cb22, and related component 621CCb23).

Figure 7:
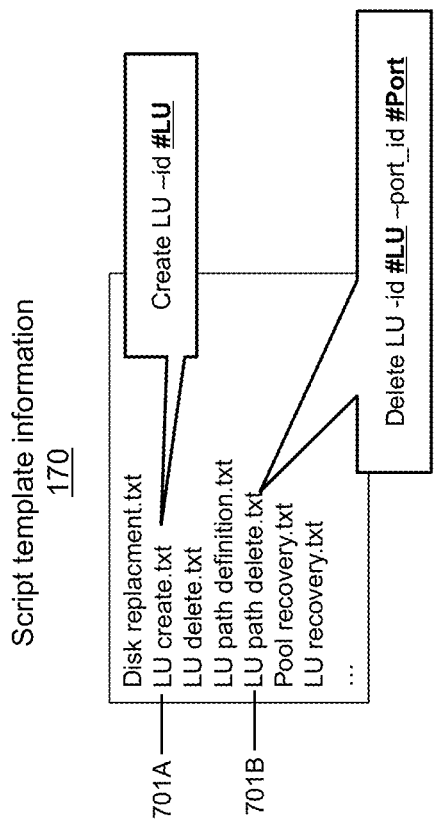
FIG. 7 illustrates an example of generation of a recovery script.

FIG. 7 schematically illustrates an example of generation of a recovery script.

A plurality of script templates 701 (for example, files) are stored in the script template information 170 (for example, a folder).

It is assumed that the recovery supporting program 173 has specified a script template 701A as the script template 701 corresponding to the procedure name 611B in the recovery procedure 601 selected by the user. It is also assumed that the recovery procedure 601 has a parameter 611C for the fault component as the parameter 611C. The recovery supporting program 173 sets an ID number (an ID number specified from the SIM list 322 in the fault status table 300 (an ID number of an LU as a fault component)) of the fault component (LU) to a parameter item (#LU highlighted in bold fonts and underlined) of the specified script template 701A.

It is assumed that the recovery supporting program 173 has specified a script template 701B as the script template 701 corresponding to the procedure name 611B in the recovery procedure 601 selected by the user. It is also assumed that the recovery procedure 601 has a parameter 611C for the fault component and a parameter 611C for the fault-related component as the parameter 611C. The recovery supporting program 173 sets an ID number of a fault component (LU) to a first parameter item (#LU highlighted in bold font and underlined) of the specified script template 701B. Moreover, the recovery supporting program 173 sets an ID number (an ID number specified from the SIM list 322 in the fault status table 300 (an ID number of a port as the fault-related component)) of the fault-related component (port) to a second parameter item (# Port highlighted in bold font and underlined) of the specified script template 701B.

Figure 8:
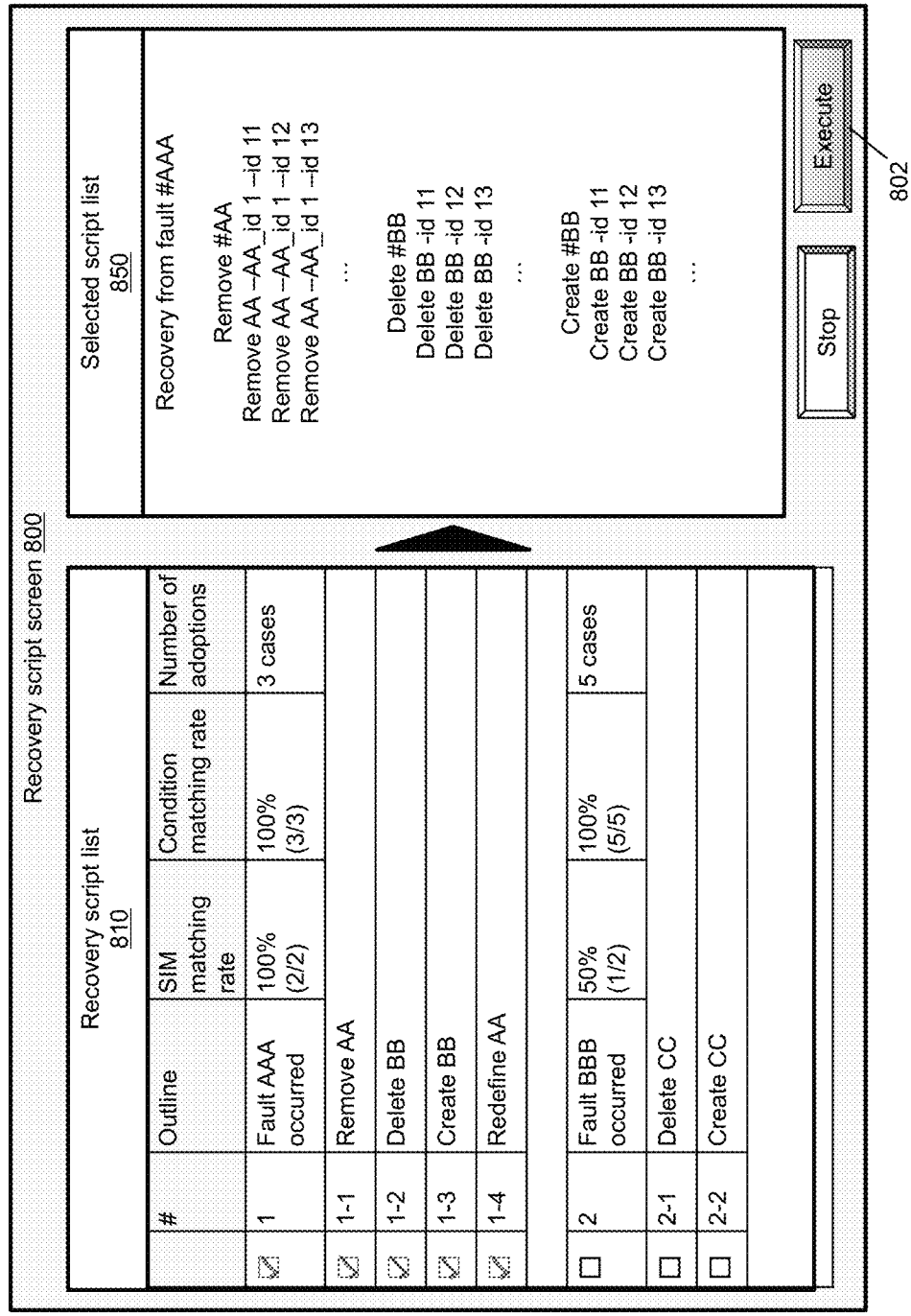
FIG. 8 illustrates a configuration of a recovery script screen.

FIG. 8 illustrates a configuration of a recovery script screen.

A recovery script screen 800 is displayed by the recovery supporting program 173. The recovery script screen 800 has a plane region in which a recovery script list 810 is displayed, a plane region in which a selected script list 850 is displayed, and a plane region in which an execution button 802 is displayed.

The recovery script list 810 is a list of information related to one or more registered faults (for example, N registered faults (N is a natural number) having higher display priorities to be described later) in which the matching rate is higher than 0%.

In the recovery script list 810, "information related to registered fault" includes an outline (information indicated by the outline 421 of a registered fault), an SIM matching rate, a condition matching rate, and the number of adoptions (information indicated by the number of adoptions 441 of a registered fault). The "matching rate" is at least an SIM matching rate among the SIM matching rate and the condition matching rate.

The SIM matching rate is a percentage of matching between the SIM list 422 corresponding to a registered fault and the SIM list 322 corresponding to a target fault. For example, when the SIM list 422 includes SIM1, SIM2, and SIM3, and the SIM list 322 corresponding to the target fault is SIM1, SIM2, and SIM4, since two SIMs among three SIMs of the SIM list 422 match the SIMs in the SIM list 322, the SIM matching rate is 2/3.

The condition matching rate is a matching rate between a target fault and all conditions 501 of the determination criterion table 500 corresponding to a registered fault (a proportion of the number of conditions 501 satisfied by a target fault to the number of conditions 501). For example, when the determination criterion table 500 has three conditions 501 and the target fault satisfies two conditions 501 among the three conditions 501, the condition matching rate 2/3.

Moreover, "information on registered fault" in the recovery script list 810 further includes a procedure name of one or more recovery procedures specified on the basis of a value column corresponding to a display target registered fault. In the present embodiment, a recovery script corresponding to the procedure name displayed on the recovery script screen 800 is generated when the recovery script screen 800 is displayed. The recovery script may be generated when a procedure name is selected by a user from the recovery script list 810 (for example, when a check mark is input in a check box corresponding to a procedure name).

In the recovery script list 810, a registered fault is positioned higher as the display priority of the registered fault is higher. The display priority corresponds to a relative display position of a display target registered fault. In the present embodiment, although the display priority is defined by an SIM matching rate, a condition matching rate, and the number of adoptions, the display priority may be defined by at least one of the SIM matching rate, the condition matching rate, and the number of adoptions. Displaying registered faults such that the information related to the registered fault is positioned higher as the display priority is higher is an example of displaying registered faults such that the information related to the registered fault is further highlighted as the display priority of the registered fault is higher. Highlighted display may be displaying in large font, displaying in bold font, and displaying in different color instead of or in addition to displaying at higher position.

As for the degree of influence on the display priority, the SIM matching rate is the highest, the condition matching rate is the next highest, and the number of adoptions is the lowest. That is, the higher the SIM matching rate, the higher becomes the display priority. When the SIM matching rate is the same, the display priority is higher as the condition matching rate is higher.

The reason why the SIM matching rate has the highest influence on the display priority is that SIM is information output from a device in the storage system 100 and is considered highly reliable (in other words, if SIMs are different, it is highly likely that the faults are different).

The reason why the condition matching rate has the second highest influence on the display priority is that a determination condition is associated information as a portion of a knowledge of a developer and using such information is one of features of the present embodiment.

The reason why the number of adoptions has the third highest influence on the display priority is that the number of adoptions of a registered fault which has been newly added recently is zero.

When a recovery procedure is selected by a user from the recovery script list 810, a recovery script (a script in which a parameter value is set) corresponding to the selected recovery procedure is displayed in the selected script list 850 by the recovery supporting program 173. A user can see a recovery script (a script in which commands are described) corresponding to the selected recovery procedure. The recovery supporting program 173 may receive a correction or a download of the script displayed in the selected script list 850 from a user.

When a predetermined operation of clicking the number of adoptions is performed for each registered fault, information indicated by the basic information/fault information 442 in the history 404 may be displayed by the recovery supporting program 173. In this way, the user can understand the presence of past records.

When the execution button 802 is pressed by a user, the recovery supporting program 173 applies all recovery scripts displayed in the selected script list 850 to the storage system 100 (the storage device 151 in which a target fault has occurred), whereby the recovery script is executed.

Hereinafter, an example of a process performed in the present embodiment will be described.

Figure 9:
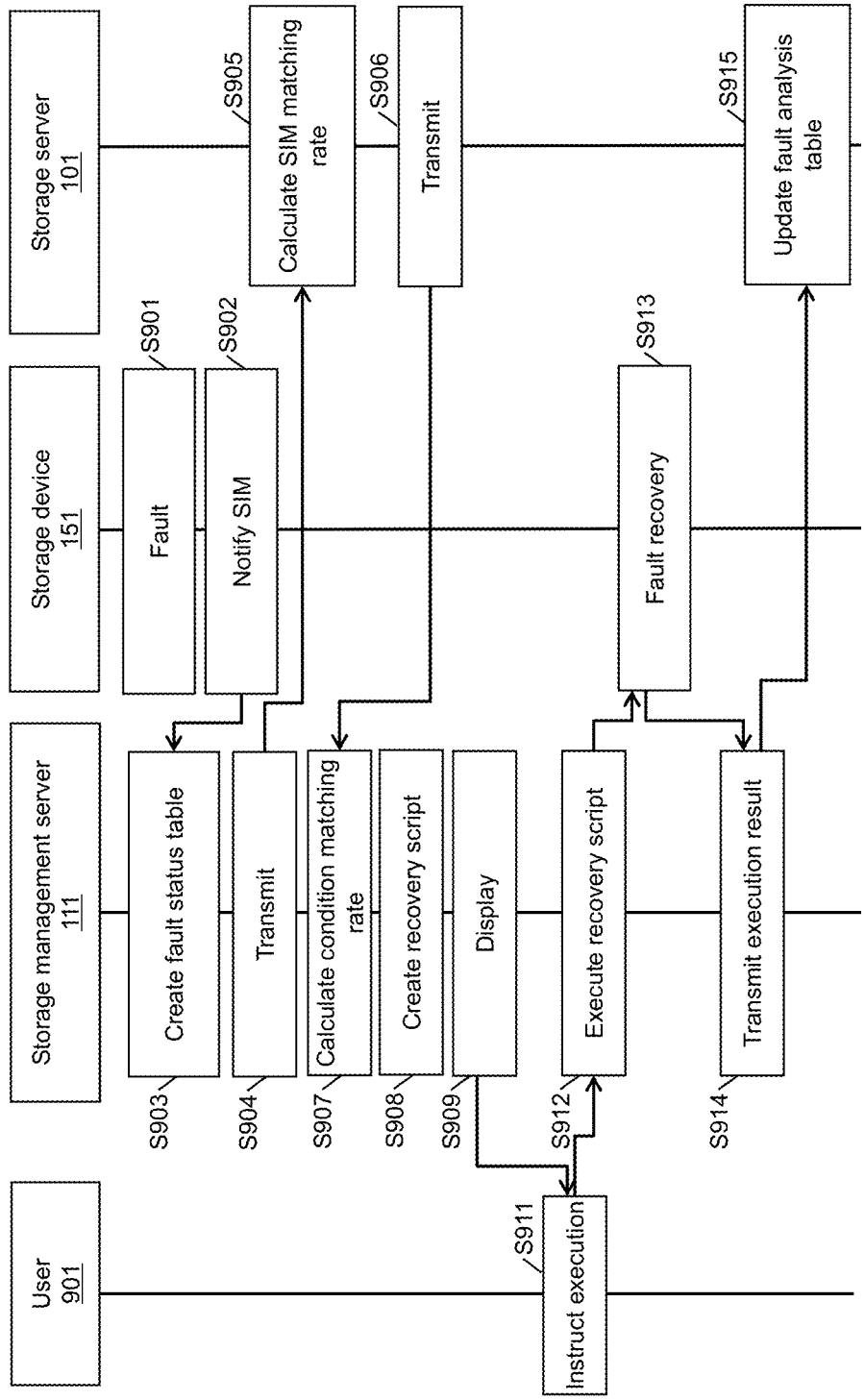
FIG. 9 illustrates the flow of processes performed when a fault occurs in a storage device.

FIG. 9 illustrates the flow of processes performed when a fault occurs in the storage device 151.

When a fault occurs in the storage device 151 (S901), one or more SIMs related to the fault (a target fault) is notified from the storage device 151 to the storage management server 111 (S902).

The storage management server 111 receives one or more SIMs. The recovery supporting program 173 creates the fault status table 300 on the basis of the received one or more SIMs (S903). Specifically, for example, the recovery supporting program 173 registers all the received SIMs (fault IDs) in the fault status table 300 as the SIM list 322. Moreover, the recovery supporting program 173 registers the time at which the SIM was received in the fault status table 300 as the occurrence time 311. Moreover, the recovery supporting program 173 acquires information related to the storage device 151 which is an SIM issuing source from at least one of the configuration information 163 and the log information 171 with the aid of the information acquisition program 161 (an information acquisition API) and registers the acquired information (the model and the version of the storage device) in the fault status table 300 as the model 312 and the version 313. The recovery supporting program 173 may acquire the information related to a component related to a component specified from the fault ID in the SIM from at least one of the configuration information 163 and the log information 171 with the aid of the information acquisition program 161 (an information acquisition API).

The recovery supporting program 173 transmits the fault status table 300 created in S903 to the storage server 101 (S904).

The storage server 101 receives the fault status table 300. The storage program 53 calculates an SIM matching rate (S905). Specifically, for example, the storage program 53 extracts a registered fault (a value column) including a fault content matching a fault content in each of the SIMs included in the SIM list 322 in the received fault status table 300 from the fault analysis table 51. The storage program 53 calculates an SIM matching rate which is a matching rate between the SIM list 422 in each of the specified registered faults and the SIM list 322 in the received fault status table 300. Instead of the storage program 53 calculating the SIM matching rate, the storage program 53 may transmit the specified registered faults (value columns) to the storage management server 111, and the recovery supporting program 173 may calculate the SIM matching rate for each of the registered faults.

The storage program 53 transmits extraction result information to the storage management server 111 (S906). The extraction result information includes information on registered faults in which the SIM matching rate exceeds 0% among the registered faults extracted in S905. Since information on a registered fault in which the SIM matching rate is 0% is not included in the extraction result information, it can be expected that an information amount of the extraction result information is reduced. Information on the registered faults in which the SIM matching rate exceeds 0% is referred to as an "extracted entry". The extracted entry includes the fault information 402, the analysis information 403 (the determination criterion table 500 and the recovery procedure table 600), and the history 404 in the value column, and the SIM matching rate calculated in S905.

The storage management server 111 receives the extraction result information. The recovery supporting program 173 calculates the condition matching rate for each of the extracted entries (S907). Specifically, the recovery supporting program 173 performs the condition determination process illustrated in FIG. 10.

The recovery supporting program 173 creates the recovery script on the basis of the respective extracted entries (S908). Specifically, the recovery supporting program 173 performs the recovery script creation process illustrated in FIG. 11.

The recovery supporting program 173 displays the recovery script screen 800 to the management client 155 (S909). Display of the recovery script screen 800 may be performs in response to an inquiry or a display request from the management client 155, for example. Pieces of information related to the registered fault are arranged on the recovery script screen 800 in descending order of display priorities. The information related to the registered fault includes an outline (information indicated by the outline 421 in the extracted entry), an SIM matching rate (the SIM matching rate in the extracted entry), a condition matching rate (the condition matching rate calculated in S907), the number of adoptions (information indicated by the number of adoptions 411 in the extracted entry), and a recovery script name (information indicated by the procedure name 611B included in the recovery procedure table 600 in the extracted entry).

A user 901 sees the recovery script screen 800 to select a recovery script, and instructs the storage management server 111 to execute the selected recovery script (for example, presses the execution button 802) (S911).

The recovery supporting program 173 executes the recovery script selected by the user in response to the instruction from the user 901 (the management client 155) (S912). That is, the recovery supporting program 173 executes a fault recovery process including transmitting a command corresponding to the recovery script selected by the user to the storage device 151.

When the fault of the storage device 151 is recovered (S913), the recovery supporting program 173 detects success in fault recovery and transmits an execution result (for example, information including the fault status table 300 transmitted in S904) to the storage server 101 (S914).

The storage server 101 receives the execution result. The storage program 53 updates the fault analysis table 51 on the basis of the received execution result (S915). Specifically, for example, the storage program 53 specifies a registered fault corresponding to the employed recovery procedure from the fault analysis table 51, adds the basic information 301 and the fault information 302 in the fault status table 300 to the basic information/fault information 422 with respect to the specified registered fault, and increments the value indicated by the number of adoptions 441 by 1.

The following process may be performed when a recovery script (a recovery procedure) desired by the user is not displayed on the recovery script screen 800 or a fault recovery process fails. That is, the recovery supporting program 173 collects dumps from the storage device 151 which is an SIM notification source and stores the collected dumps in the storage server 101. The development client 192 acquires and displays the dumps stored in the storage server 101. A developer analyzes the dumps. The development client 192 stores information input on the basis of the analysis result of the developer in the fault analysis table 51. The fault analysis table 51 may be edited manually by the developer.

Figure 10:
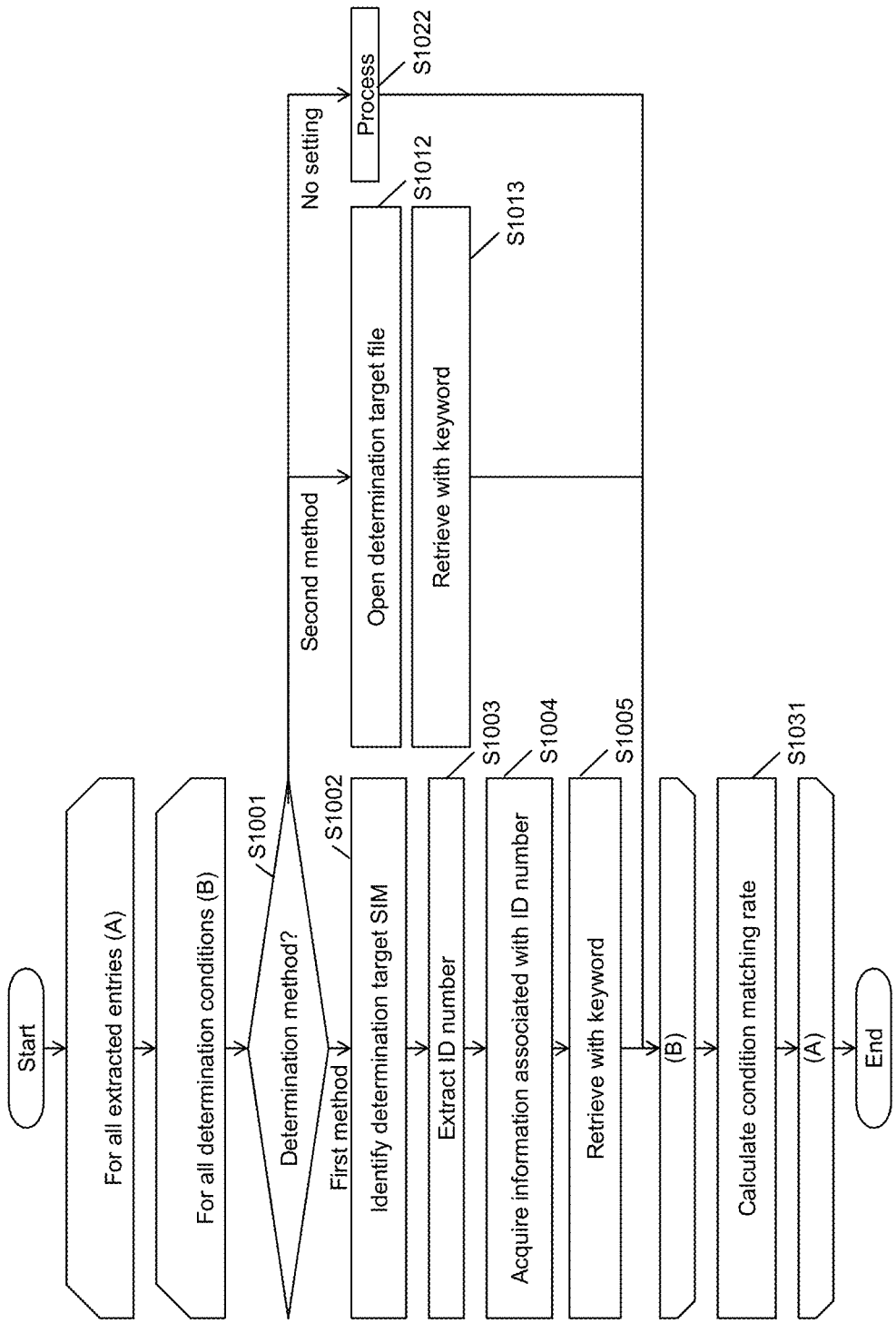
FIG. 10 illustrates the flow of a condition determination process.

FIG. 10 illustrates the flow of the condition determination process.

The recovery supporting program 173 executes the following processes with respect to all extracted entries in the extraction result information (loop (A)). Hereinafter, one extracted entry (referred to as an "extracted entry of interest" in description of FIG. 10) will be described as an example.
(10-1) S1001,
(10-2) any one of S1002 to S1005, S1012, S1013, and S1022, and
(10-3) S1031

The recovery supporting program 173 executes (10-1) and (10-2) with respect to all determination conditions 501 specified from the extracted entry of interest (loop (B)). Hereinafter, one determination condition 501 (referred to as a "determination condition of interest 501" in description of FIG. 10) will be described as an example.

The recovery supporting program 173 determines the determination method 511B in the determination condition of interest 501 (S1001). The value indicated by the determination method 511B includes a first method of "determination based on detailed API of fault component", a second method of "determination based on log file", and no setting "–". The first method is a method that uses the information acquisition program 161 (the information acquisition API) in order to refer to the detailed information of a fault component. The second method is a method that searches the log information 171 (for example, one or more log files) using a keyword. The no setting means that neither the first method nor the second method is set.

When the determination method 511B indicates the first method, the recovery supporting program 173 specifies an SIM of a determination target component type (a target indicated by the determination target 511C in the determination condition of interest 501) from the SIM list 322 in the fault status table 300 (S1002). The recovery supporting program 173 extracts an ID number of a determination target component from the SIM specified in S1002 (S1003). The recovery supporting program 173 acquires information associated with the ID number extracted in S1003 with the aid of the information acquisition program 161 (S1004). The recovery supporting program 173 searches for information associated with a keyword (a keyword indicated by the keyword 511E in the determination condition of interest 501) from the information acquired in S1004 (S1005). A determination result of OK is obtained when the search yields a hit, whereas a determination result of NG is obtained when the search does not yield a hit.

When the determination method 511B indicates the second method, the recovery supporting program 173 opens a determination target file (a file indicated by the determination target 511C in the determination condition of interest 501) from the log information 171 (S1012). The recovery supporting program 173 searches for information associated with a keyword (a keyword indicated by the keyword 511E in the determination condition of interest 501) from the file opened in step S1012 (S1013). A determination result of OK is obtained when the search yields a hit, whereas a determination result of NG is obtained when the search does not yield a hit.

When the determination method 511B indicates no setting, the recovery supporting program 173 performs a predetermined process (S1022). For example, the recovery supporting program 173 transmits a message (for example, an email) instructing the input of the determination method 511B to the determination condition of interest 501 to the developer. A developer seeing the message can add the determination method 511B to the determination condition of interest 501.

When (10-1) and (10-2) are performed for all determination conditions 501 of the extracted entry of interest, a determination result of OK or NG is obtained for each of all determination conditions 501 (for example, the determination results on the determination conditions 501 are stored in the storage unit 135). The recovery supporting program 173 calculates a condition matching rate (for example, condition matching rate=number of OKs/[number of OKs+number of NGs]) of the extracted entry of interest on the basis of the determination results on all determination conditions 501 (S1031).

When all determination conditions in which the determination result is OK include the necessity of recovery 511F of "Unnecessary", a recovery procedure is not displayed for the extracted entry of interest. This is because the necessity of recovery 511F of "Unnecessary" means that there is no problem (already recovered or recovery is not necessary).

Figure 11:
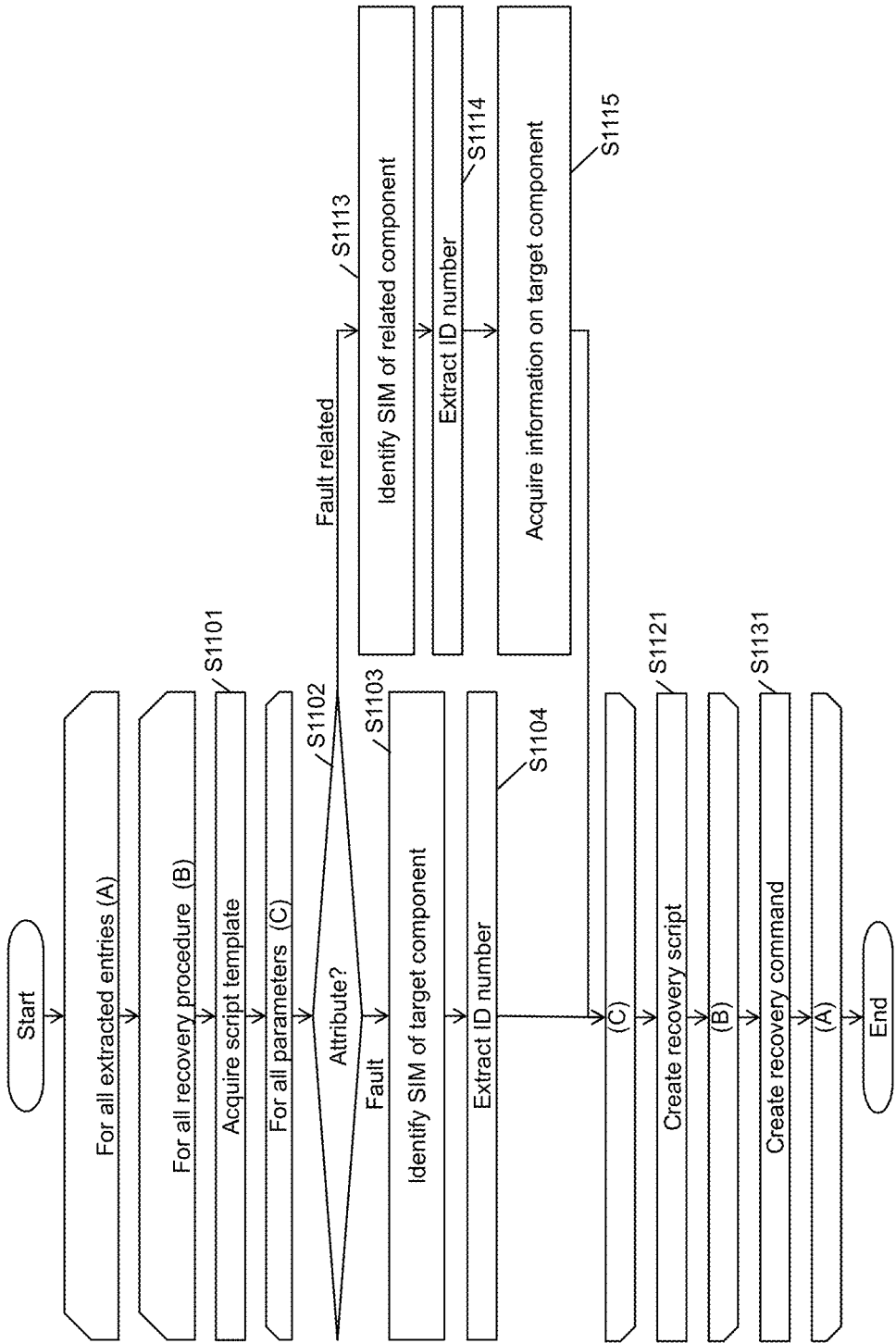
FIG. 11 illustrates the flow of a recovery script creation process.

FIG. 11 illustrates the flow of the recovery script creation process.

The recovery supporting program 173 executes the following processes with respect to all extracted entries in the extraction result information (loop (A)). Hereinafter, one extracted entry (referred to as an "extracted entry of interest" in description of FIG. 11) will be described as an example.
(11-1) S1101,
(11-2) S1102,
(11-3) any one of S1103, S1104, and S1113 to S1115,
(11-4) S1121, and
(11-5) S1031

The recovery supporting program 173 executes (11-1) to (11-4) with respect to all recovery procedures 601 specified from the extracted entry of interest (loop (B)). Hereinafter, one recovery procedure 601 (referred to as a "recovery procedure of interest 601" in description of FIG. 11) will be described as an example.

The recovery supporting program 173 acquires a script template (file) corresponding to the procedure name 611B in the recovery procedure of interest 601 from the script template information 170 (S1101).

The recovery supporting program 173 executes (11-2) and (11-3) with respect to all parameters 611C in the recovery procedure of interest 601 (loop (C)). Hereinafter, one parameter 611C (referred to as a "parameter of interest 611C" in description of FIG. 11) will be described as an example.

The recovery supporting program 173 determines the attribute 621CB in the parameter of interest 611C (S1102).

When the attribute 621CB is "fault component", the recovery supporting program 173 specifies an SIM corresponding to the target component type (a target indicated by the target component 621CA in the parameter of interest 611C) from the SIM list 322 in the fault status table 300 (S1103). The recovery supporting program 173 extracts an ID number of a component from the SIM specified in S1103 (S1104).

When the attribute 621CB is "fault-related component", the recovery supporting program 173 specifies an SIM of a related component type (a target indicated by the related component 621CC in the parameter of interest 611C) from the SIM list 322 in the fault status table 300 (S1113). The recovery supporting program 173 extracts an ID number of the component from the SIM specified in S1113 (S1114). The recovery supporting program 173 acquires the information (information including an ID number of the target component) of the target component from the configuration information 163 or the log information 171 using the ID number acquired in S1114 with the aid of the information acquisition program 161 (the information acquisition API) (S1115). The fault component and the API may correspond to each other in an one-to-one correspondence.

The recovery supporting program 173 creates a recovery script corresponding to the recovery procedure of interest 601 (S1121). That is, the recovery supporting program 173 sets the ID numbers (parameter values) acquired for all parameters 611C in the recovery procedure of interest 601 to the parameter item in the script template acquired in S1101.

When (11-1) to (11-4) are performed for all recovery procedures 601 of the extracted entry of interest, the recovery scripts are prepared for all recovery procedures 601. The recovery supporting program 173 merges the recovery scripts of all recovery procedures 601 to create a recovery command (S1131).

Hereinabove, the present embodiment has been described.

According to a comparative example, a general computer displays a fault recovery method associated with an ID of an occurred fault in response to the input of the ID. However, it is difficult to apply the technology related to such a general computer to fault recovery of the storage system 100. This is because, in the storage system 100, although if a fault occurs in a certain component, an SIM (an example of a message notified due to a fault) is notified to a plurality of components including the component, it is difficult to identify an overall type of the fault (it is difficult to make an estimation of the bottom cause of the fault) from the plurality of SIMs.

According to the present embodiment, a relation between a fault, the details of the fault (specifically, for example, a SIM list notified from a storage device in which the fault has occurred and conditions corresponding to a fault the same as or similar to the fault), and a series of recovery procedures of the fault is stored for each fault in the fault analysis table 51 according to a knowledge of a developer. When a broad estimation of a registered fault corresponding to a target fault (an occurred fault) is made, a matching rate with a SIM list input for the registered fault and a matching rate with one or more determination conditions input for the registered fault are used. In this way, it is possible to enhance the accuracy of estimation.

According to the present embodiment, the number of adoptions which is an example of information updated on the basis of a feedback is stored in the fault analysis table 51, and the number of adoptions as well as the matching rate have an influence on the display priority. This contributes to enhancing the accuracy of estimation.

According to the present embodiment, a recovery script is automatically generated for each recovery procedure of a series of recovery procedures (the fault recovery process) using an ID number (an ID number of a component) extracted from a SIM or the configuration information. Since the storage system 100 has many components, when the recovery script is generated automatically, the user's operation for the fault recovery is reduced.

While several embodiments have been described, these embodiments are examples for describing the present invention, and the scope of the present invention is not limited to these embodiments only. The present invention can be implemented in various other forms.

For example, a program more complex than the script may be generated rather than generating the recovery script for each recovery supporting program, a program corresponding to two or more recovery procedures may be generated, and a program corresponding to a series of recovery procedures (the fault recovery process) corresponding to recovery of a registered fault may be generated.

For example, a recovery procedure displayed may be request items necessary for examining the causes of a fault instead of the recovery script.

REFERENCE SIGNS LIST

100 Storage system

The invention claimed is:

1. A non-transitory computer readable storage medium storing a computer program for causing a computer to:
specify a matching rate between an occurred fault and each of one or more registered faults on the basis of fault analysis information which is information indicating, for each of the one or more registered faults, a relation between a fault in a storage system having a plurality of components and a fault detail including knowledge base information, wherein each of the one or more registered faults is a fault in which the information is registered in the fault analysis information; and
display information related to the one or more registered faults including the specified matching rate with respect to each of the one or more registered faults,
wherein
in the fault analysis information, the fault detail includes, for each of the one or more registered faults, information related to a series of recovery procedures for that registered fault,
for each of the one or more registered faults, information related to the one or more registered faults includes information related to a series of recovery procedures corresponding to that registered fault, in the fault analysis information, the information related to the series of recovery procedures includes, for each of the one or more registered faults, a procedure name, each of one or more recovery procedures that form the series of recovery procedures is associated with a component, and the computer program further causes the computer to generate a recovery program for executing each of the one or more recovery procedures that form at least a series of recovery procedures selected by a user among a series of one or more recovery procedures corresponding to each of the one or more registered faults, and display information related to the generated recovery program with respect to each of the one or more recovery procedures that form the series of recovery procedures selected by the user among the series of one or more recovery procedures corresponding to each of the one or more registered faults.

2. The medium according to claim 1, wherein in the fault analysis information, the fault detail includes, for each of the one or more registered faults, a message list which is one or more messages notified from a storage system in which that registered fault has occurred, each of the one or more messages is associated with a component in a fault state, and the matching rate includes, for each of the one or more registered faults, a message matching rate which is a matching rate between a message list corresponding to that registered fault and a message list corresponding to the occurred fault.

3. The medium according to claim 2, wherein in the fault analysis information, the fault detail further includes, for each of the one or more registered faults, one or more determination conditions which are one or more conditions corresponding to that registered fault, and the matching rate includes, for each of the one or more registered faults, a condition matching rate which is a matching rate between the occurred fault and one or more determination conditions corresponding to that registered fault.

4. The medium according to claim 3, wherein each of the one or more determination conditions includes information indicating a determination method, a determination target, and a keyword, in each of the one or more determination conditions, when a search for the keyword in information specified using the determination method and the determination target in each of the one or more determination conditions yields a hit, the determination condition is satisfied, and for each of the one or more registered faults, the condition matching rate is a proportion of the number of the one or more determination conditions that are satisfied to the number of determination conditions corresponding to that registered fault.

5. The medium according to claim 3, wherein for each of the one or more registered faults, a display of information related to each of the one or more registered faults is further highlighted as a display priority of that registered fault, and for each of the one or more registered faults, the display priority is higher as the message matching rate is higher.

6. The medium according to claim 4, wherein in the fault analysis information, the fault detail includes, for each of the one or more registered faults, a number of adoptions which is the number of times of adoption of a series of recovery procedures for that registered fault, for each of the one or more registered faults, information related to the one or more registered faults includes the number of adoptions corresponding to that registered fault, and for each of the one or more registered faults, a display priority is higher as the condition matching rate is higher when the message matching rate is the same.

7. The medium according to claim 1, wherein the recovery program generated for each of the one or more recovery procedures is a recovery script, one or more messages are notified from a storage system in which the occurred fault has occurred, each of the messages is associated with a component in a fault state, and the computer program causes the computer, for each of the one or more recovery procedures, to:

generate a recovery script corresponding to that recovery procedure by setting at least one of a component ID number in a message corresponding to a component associated with that recovery procedure and a component ID number acquired from configuration information related to a configuration of the storage system using a value to a script template corresponding to that recovery procedure.

8. A management system of a storage system having a plurality of components, the management system comprising:

an interface unit having an interface device connected to a display device; and a processor unit including one or more processors connected to the interface unit, wherein the processor unit specifies a matching rate between an occurred fault and each of one or more registered faults on the basis of fault analysis information which is information indicating, for each of the one or more registered faults, a relation between a fault in the storage system and a fault detail including knowledge base information, each of the one or more registered faults is a fault in which the information is registered in the fault analysis information, and the management system displays information related to the one or more registered faults including the specified matching rate with respect to each of the one or more registered faults on a display, wherein in the fault analysis information, the fault detail includes, for each of the one or more registered faults, information related to a series of recovery procedures for that registered fault, for each of the one or more registered faults, information related to the one or more registered faults includes information related to a series of recovery procedures corresponding to that registered fault, in the fault analysis information, the information related to the series of recovery procedures includes, for each of the one or more registered faults, a procedure name, each of one or more recovery procedures that form the series of recovery procedures is associated with a component, and the processor unit further generates a recovery program for executing each of the one or more recovery procedures that form at least a series of recovery procedures selected by a user among a series of one or more recovery procedures corresponding to each of the one or more registered faults, and displays information related to the generated recovery program with respect to each of the one or more recovery procedures that form the series of recovery procedures selected by the user among the series of one or more recovery procedures corresponding to each of the one or more registered faults.

9. A method of supporting recovery of a fault in a storage system including a plurality of components, the method comprising:

specifying a matching rate between an occurred fault and each of one or more registered faults on the basis of fault analysis information which is information indicating, for each of the one or more registered faults, a relation between a fault in the storage system and a fault detail including knowledge base information, wherein each of the one or more registered faults is a fault in which the information is registered in the fault analysis information, and displaying information related to the one or more registered faults including the specified matching rate with respect to each of the one or more registered faults, wherein in the fault analysis information, the fault detail includes, for each of the one or more registered faults, information related to a series of recovery procedures for that registered fault, for each of the one or more registered faults, information related to the one or more registered faults includes information related to a series of recovery procedures corresponding to that registered fault, in the fault analysis information, the information related to the series of recovery procedures includes, for each of the one or more registered faults, a procedure name, each of one or more recovery procedures that form the series of recovery procedures is associated with a component, and the method further comprises generating a recovery program for executing each of the one or more recovery procedures that form at least a series of recovery procedures selected by a user among a series of one or more recovery procedures corresponding to each of the one or more registered faults, and displaying information related to the generated recovery program with respect to each of the one or more recovery procedures that form the series of recovery procedures selected by the user among the series of one or more recovery procedures corresponding to each of the one or more registered faults.

* * * * *